3,136,801
PHOSPHORUS-CONTAINING CARBAMIC COMPOSITION

Thomas Robert Hopkins, Merriam, Kans., assignor to The Lubrizol Corporation, Wickliffe, Ohio, a corporation of Ohio
No Drawing. Filed Oct. 12, 1961, Ser. No. 144,554
7 Claims. (Cl. 260—455)

This invention relates to aromatic phosphorus-containing carbamides and carbamates and to a process for preparing the same.

Carbamides, also known as ureas or ureides, are amides of carbamic acids whereas carbamates, also known as urethanes, are esters of carbamic acids. These derivatives of carbamic acids are useful in the formulation of weed killers, pesticides, plastics, resins, pharmaceuticals, etc. In many applications, the presence of phosphorus in such formulation imparts additional desirable properties and enhances its utility. It is therefore desirable to have compositions in which both phosphorus and carbamic radicals are present. Accordingly, it is a principal object of this invention to provide such compositions.

It is also an object of this invention to provide a process for preparing organic phosphorus-containing carbamic compositions.

It is also an object of this invention to provide aromatic phosphorus-containing carbamides and carbamates.

These and other objects are attained in accordance with this invention by providing an aromatic phosphorus-containing carbamic compound having the formula $$\text{Ar}-\overset{\overset{X}{\|}}{\underset{\underset{Ar}{|}}{P}}-\overset{H}{\underset{|}{N}}-\overset{X}{\overset{\|}{C}}-G$$

wherein Ar is an aromatic radical, X is selected from the class consisting of sulfur and oxygen, and G is selected from the class consisting of amino and hydrocarbon-oxy radicals. It will be noted that the terms "carbamide" and "carbamate," when used in a generic sense, include both the oxy and the thio compounds.

The aromatic radical of the compounds of this invention is, for the most part, phenyl or naphthyl. It may be a hydrocarbon-substituted phenyl or naphthyl radical in which the hydrocarbon substituent is aryl, alkyl, or cycloalkyl radical such as phenyl, methyl, ethyl, cyclopentyl, decyl, benzyl, dodecyl, behenyl, or polyisobutene (molecular weight of 1500) radical. The phenyl or naphthyl radical may contain a polar substituent such as chloro, nitro, alkoxy, or phenoxy radical.

Specific examples of the carbamic compounds of this invention include diphenylphosphinic-carbamide,
diphenylphosphinothioic-carbamide,
diphenylphosphinic-thiocarbamide,
diphenylphosphinothioic-thiocarbamide,
di(p-tertiarybutylphenyl)phosphinothioic-carbamide,
N-ethyl-N'-di(p-tertiary-butylphenyl)phosphinothioic-carbamide,
N,N-dimethyl-N'-di(p-tertiary-butylphenyl)phosphinothioic-carbamide,
N-cyclohexyl-N'-di(p-cyclohexylphenyl)phosphinothioic-carbamide,
N-phenyl-N'-dinaphthylphosphinic-carbamide,
methyl di-o-tolylphosphinic-carbamate,
cyclohexyl di-o-tolylphosphinic-carbamate,
phenyl di-o-tolylphosphinic-carbamate,
dodecyl di-o-tolylphosphinic-carbamate,
o-tolyl diphenylphosphinothioic-carbamate,
dodecyl diphenylphosphinothioic-thiocarbamate,
2-amino-ethyl diphenylphosphinothioic-carbamate,
N-morpholino-N'-diphenylphosphinothioic-carbamide, and
N-piperazino-N'-diphenylphosphinothioic-carbamide.

The carbamic compounds of this invention are obtained by the reaction of an aromatic phosphinyl isocyanate having the formula $$\text{Ar}-\overset{\overset{X}{\|}}{\underset{\underset{Ar}{|}}{P}}-\text{NCX}$$

wherein Ar and X are as defined previously, with an active-hydrogen compound selected from the class consisting of amines and hydroxy-hydrocarbons such as alcohols or phenols. In most instances the reaction is exothermic and is best carried out in the presence of a diluent or solvent such as ether, dioxane, naphtha, n-hexane, Cellosolve, carbon tetrachloride, benzene, xylene, or the like. The preferred temperature for the reaction is about 0°–50° C. Higher temperatures may be used but ordinarily are unnecessary. External cooling of the reaction mixture may be used in order to maintain the reaction temperature within the preferred range. The reaction may be represented as follows:

$$\text{Ar}-\overset{\overset{X}{\|}}{\underset{\underset{Ar}{|}}{P}}-\text{NCX} + \text{GH} \longrightarrow \text{Ar}-\overset{\overset{X}{\|}}{\underset{\underset{Ar}{|}}{P}}-\overset{H}{\underset{|}{N}}-\overset{X}{\overset{\|}{C}}-G$$

wherein Ar, X, and G are as defined previously. Thus GH is an active-hydrogen compound, i.e., an amine or a hydroxy-hydrocarbon.

The aromatic phosphinyl isocyanates are obtained by the reaction of aromatic phosphinyl halide, such as diphenylphosphinothioic chloride, with silver cyanate or silver thiocyanate. They are described in co-pending application Serial No. 144,548, filed October 12, 1962.

The relative proportions of the reactants are not critical. Ordinarily the active-hydrogen compound is employed in excess. Such excess may function as a diluent and is to be removed by distillation after the reaction is complete. The product is usually a solid and can be recovered by filtration, recrystallization, or any such known technique.

The amines useful in the reaction may be aliphatic amines, aromatic amines, carbocyclic amines, or heterocyclic amines. Specific examples include ammonia, methylamine, dimethylamine, n-pentylamine, aniline, isobutylamine, o-toluidine, alpha-naphthylamine, cyclohexylamine, di-cyclohexylamine, dodecylamine, ethyl diamine, diethylene triamine, tetraethylene pentamine, morpholine, piperazine, N-(2-aminoethyl)piperazine, N-methylaniline, and phenylene diamine. The hydroxy-hydrocarbons useful in the reaction are alcohols or phenols such as methyl alcohol, ethyl alcohol, cyclohexyl alcohol, naphthol, phenol, dodecyl alcohol, behenyl alcohol, decyl alcohol, and p-tertiary-butylphenol.

The following examples illustrate the reaction useful for preparing the phosphorus-containing carbamic compounds of this invention.

Example 1

Di-phenylphosphinic isocyanate (i.e., $$(\text{C}_6\text{H}_5)_2\text{P(O)NCO})$$

(13 grams) is added in small increments to anhydrous methyl alcohol (20 cc.) at 25° C. An exothermic reaction occurs. The mixture is heated to the reflux temperature and excess methyl alcohol is removed by distillation. The residue is recrystallized from a benzene-naphtha mixture to give methyl diphenylphosphinic-carbamate having a melting point of 132–133° C.

Example 2

A solution of 26 grams of diphenylphosphinic isocyanate in 50 cc. of ether is added slowly to 50 cc. of aniline dissolved in 50 cc. of ether at 25° C. An exothermic reaction occurs. The mixture is allowed to stand at room temperature overnight and filtered. The solid is washed with ether, dried, and recrystallized from glacial acetic acid to give N-phenyl-N'-diphenylphosphinic-carbamide.

Example 3

The procedure of Example 1 is followed except that diphenylphosphinothioic isocyanate is used in place of diphenylphosphinic isocyanate. The product is methyl diphenylphosphinothioic-carbamate having a melting point of 115°–117° C.

Example 4

The procedure of Example 1 is followed except that ethyl alcohol is used in place of methyl alcohol. The product is ethyl diphenylphosphinic carbamate having a melting point of 111°–114° C.

Example 5

The procedure of Example 1 is followed except that ethyl alcohol is used in place of methyl alcohol and that diphenylphosphinothioic isocyanate is used in place of diphenylphosphinic isocyanate. The product is ethyl diphenylphosphinothioic-carbamate having a melting point of 98°–99° C.

Example 6

The procedure of Example 1 is followed except that tertiary butyl alcohol is used in place of methyl alcohol and that diphenylphosphinothioic isocyanate is used in place of diphenylphosphinic isocyanate. The product is tertiary butyl-diphenylphosphinothioic-carbamate having a melting point of 152°–153° C.

Example 7

The procedure of Example 1 is followed except that n-hexyl alcohol is used in place of methyl alcohol. The product is n-hexyl diphenylphosphinic-carbamate having a melting point of 117°–118° C.

Example 8

The procedure of Example 2 is followed except that diphenylphosphinothioic isocyanate is used in place of diphenylphosphinic isocyanate. The product is N-phenyl-N'-diphenylphosphinothioic-carbamide.

Example 9

The procedure of Example 2 is followed except that n-butylamine is used in place of aniline. The product is N-butyl-N'-diphenylphosphinic-carbamide having a melting point of 186°–187° C.

Example 10

The procedure of Example 2 is followed except that n-pentylamine is used in place of aniline and that diphenylphosphinothioic isocyanate is used in place of diphenylphosphinic isocyanate. The product is N-n-pentyl-N'-diphenylphosphinothioic-carbamide having a melting point of 177°–178° C.

The phosphorus-containing carbamic compounds of this invention are useful as weed killers, insecticides, rust-inhibitors in paint, oxidation-inhibitors in lubricating oils and many other applications. A specific illustration of utility of such compounds is an insecticidal composition comprising an aqueous emulsion of 0.5 part (by weight) of the product of Example 1, 2 parts of an emulsifier (e.g., sodium dodecyl benzene sulfonate), 2 parts of a volatile organic solvent (e.g., kerosene), and 100 parts of water. This composition is effective in controlling infestation of aphids on vegetation.

What is claimed is:

1. A phosphorus-containing carbamic compound selected from the class consisting of compounds having the formula

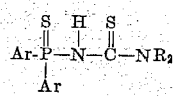

and compounds having the formula

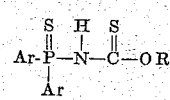

wherein Ar is a radical selected from the class consisting of phenyl and alkylphenyl radicals having up to about 12 carbon atoms in the aryl group and R is a radical selected from the class consisting of hydrogen, phenyl, and alkyl radicals having up to about 20 carbon atoms.

2. A phosphorus-containing carbamic compound having the formula

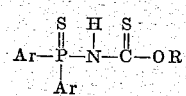

wherein Ar is an alkylphenyl radical having up to about 12 carbon atoms in the alkyl group and R is a lower alkyl radical having up to about 12 carbon atoms.

3. The compound of claim 2 wherein Ar is tolyl radical.

4. A phosphorus-containing carbamic compound having the formula

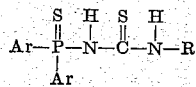

wherein Ar is phenyl radical and R is an alkyl radical having up to about 12 carbon atoms.

5. A phosphorus-containing carbamic compound having the formula

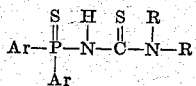

wherein Ar is phenyl radical and R is an alkyl radical having up to about 12 carbon atoms.

6. N - phenyl - N' - diphenylphosphinothioic-thiocarbamide.

7. Methyl N-diphenylphosphinothioic-thiocarbamate.

References Cited in the file of this patent

FOREIGN PATENTS 952,712   Germany _____ Nov. 22, 1956

OTHER REFERENCES

Wagner et al.: Synthetic Organic Chemistry (New York, 1953), page 645, QD262. W24.